Figure 3:
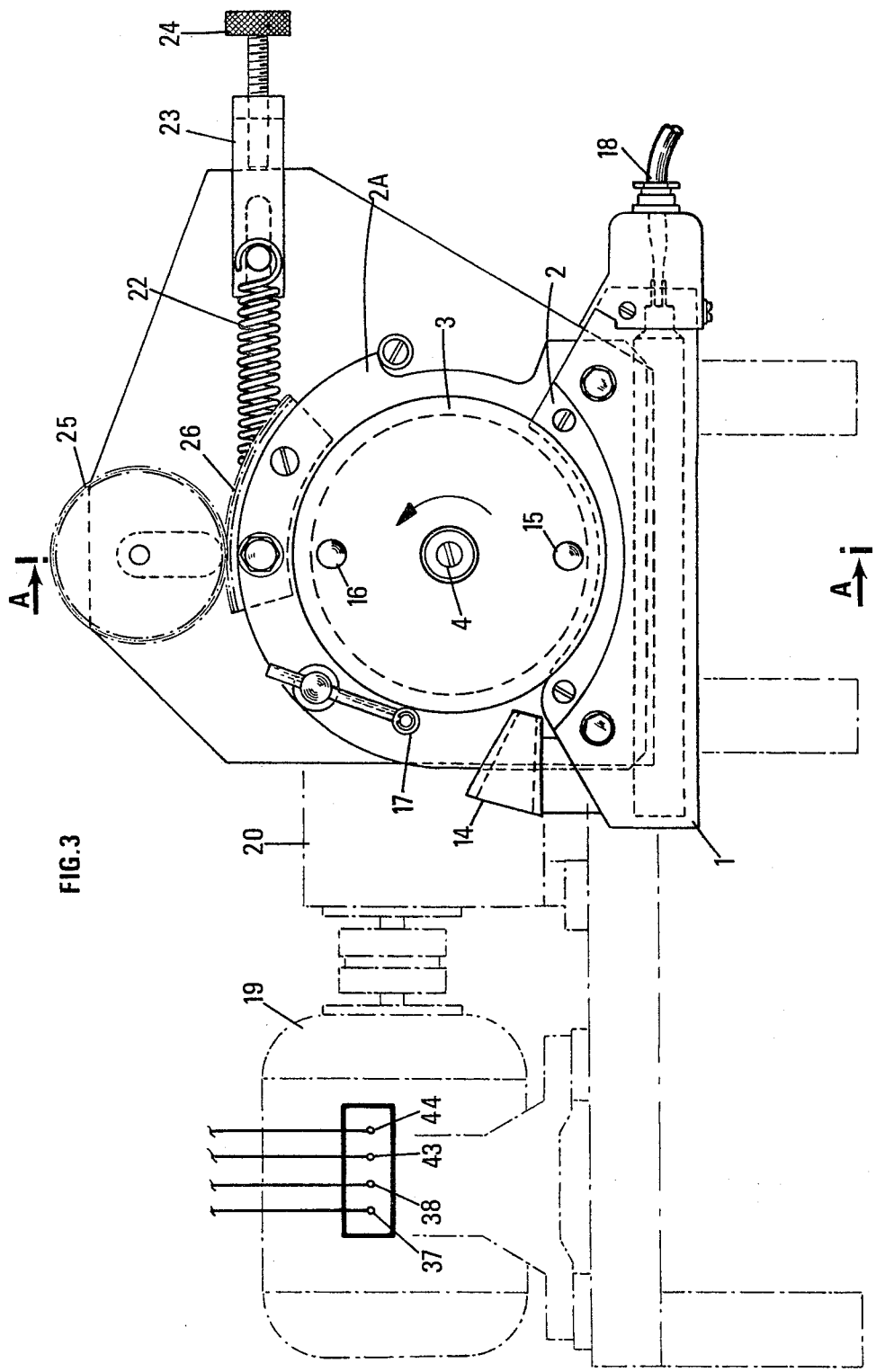

United States Patent [19]

Bonavent et al.

[11] 3,966,388

[45] June 29, 1976

[54] DEVICE FOR CONTINUOUSLY MANUFACTURING CURVED PROFILED MEMBERS OF PLASTIC MATERIAL REINFORCED WITH FILAMENTS

[75] Inventors: Gerard Bonavent, Rueil-Malmaison; Michel Huvey, Bougival, both of France

[73] Assignee: Institut Francais du Petrole, Rueil-Malmaison, France

[22] Filed: Aug. 19, 1975

[21] Appl. No.: 605,887

[30] Foreign Application Priority Data

Sept. 4, 1974 France.............................30241

[52] U.S. Cl.............................425/505; 425/150
[51] Int. Cl.²...................................B29G 7/00
[58] Field of Search..............164/154; 264/174; 425/150, 505

[56] References Cited

UNITED STATES PATENTS

| | | | |
|---|---|---|---|
| 1,943,436 | 1/1934 | Hopkinson | 425/505 X |
| 2,398,435 | 4/1946 | Marks | 425/505 X |
| 2,721,599 | 10/1955 | Van De Vanter | 264/174 X |

Primary Examiner—Robert D. Baldwin
Attorney, Agent, or Firm—Craig & Antonelli

[57] ABSTRACT

This device comprises a die formed of two elements a first of which is secured to the frame of the device and the second rotatably mounted on this frame, means for continuously measuring the braking torque developed by the profiled member within the die and means for automatically controlling the rotation speed of the second element in response to the variations of the braking torque.

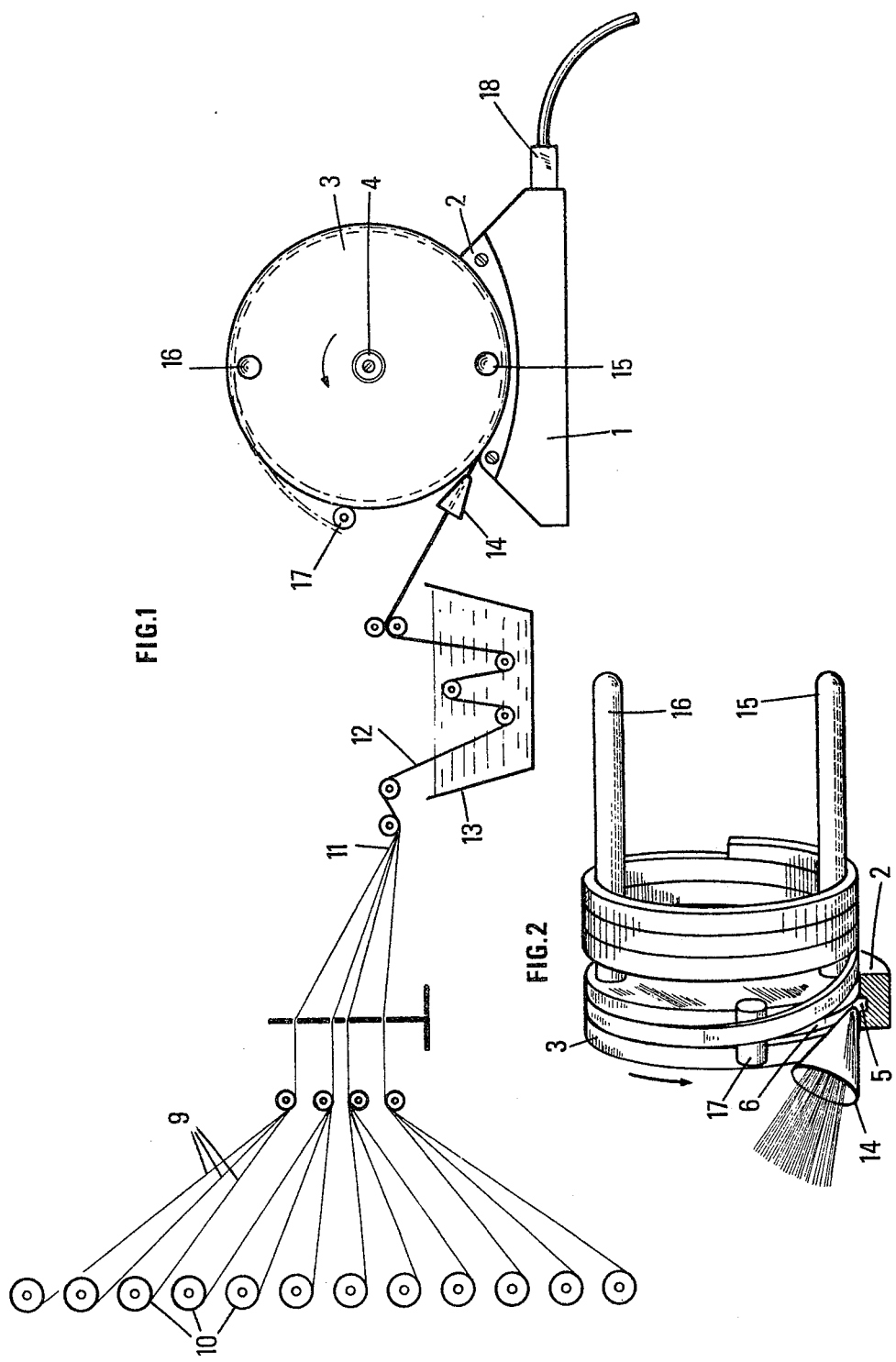

DEVICE FOR CONTINUOUSLY MANUFACTURING CURVED PROFILED MEMBERS OF PLASTIC MATERIAL REINFORCED WITH FILAMENTS

The present invention relates to a device for continuously manufacturing curved profiled members made of plastic material reinforced by filaments.

This device comprises a frame, a die formed of two complementary elements a first of which is secured to the frame, the other being rotatably mounted on the frame and connected to rotation means.

At least one of said two die elements comprises a groove which, together with the other element, defines the cross-section of a passage through the die for an assembly of filaments impregnated with a plastic material. This cross-section may be of any shape (round, square, trapezoidal, with straight or curved edges, solid or hollow . . . etc. . . .).

The device also includes means for heating the die and means for drawing the profiled member at its outlet from the die.

Such a device would be of high industrial interest, due to the numerous possible uses for the so-manufactured curved members (e.g. as curved stiffening elements for ship- or plane-building, architectural elements, furniture, construction or spiral windings having continuous turns which might or not be interlocked with each other . . . etc. . . .).

However for the construction of such a device serious difficulties are encountered.

These difficulties are mainly due to the fact that the first element of the die, which is secured to the frame, should be maintained at a rigorously constant temperature, in order that the progress of the polymerization reaction of the plastic material remains constant at the outlet of the die.

Such a result cannot be obtained by the thermal regulation means now available.

Consequently when the die becomes colder, the obtained product is too soft to be ejected from this die, while, on the contrary, in case of overheating, the products stick onto the die, which progressively leads to a blocking or jamming on, of the rotating element of the die.

Actually a decrease in the rotation speed of this element, due to an increasing braking torque, enhances the residence time of the plastic material in the die and consequently the progress of the polymerization reaction is further increased, thus still increasing the braking torque.

This process is thus cumulative and the state of equilibrium which corresponds to a good production is essentially unstable.

An object of the invention is accordingly to provide a device which does not suffer from this major drawback and operates continuously under stable conditions.

Figure 3A:
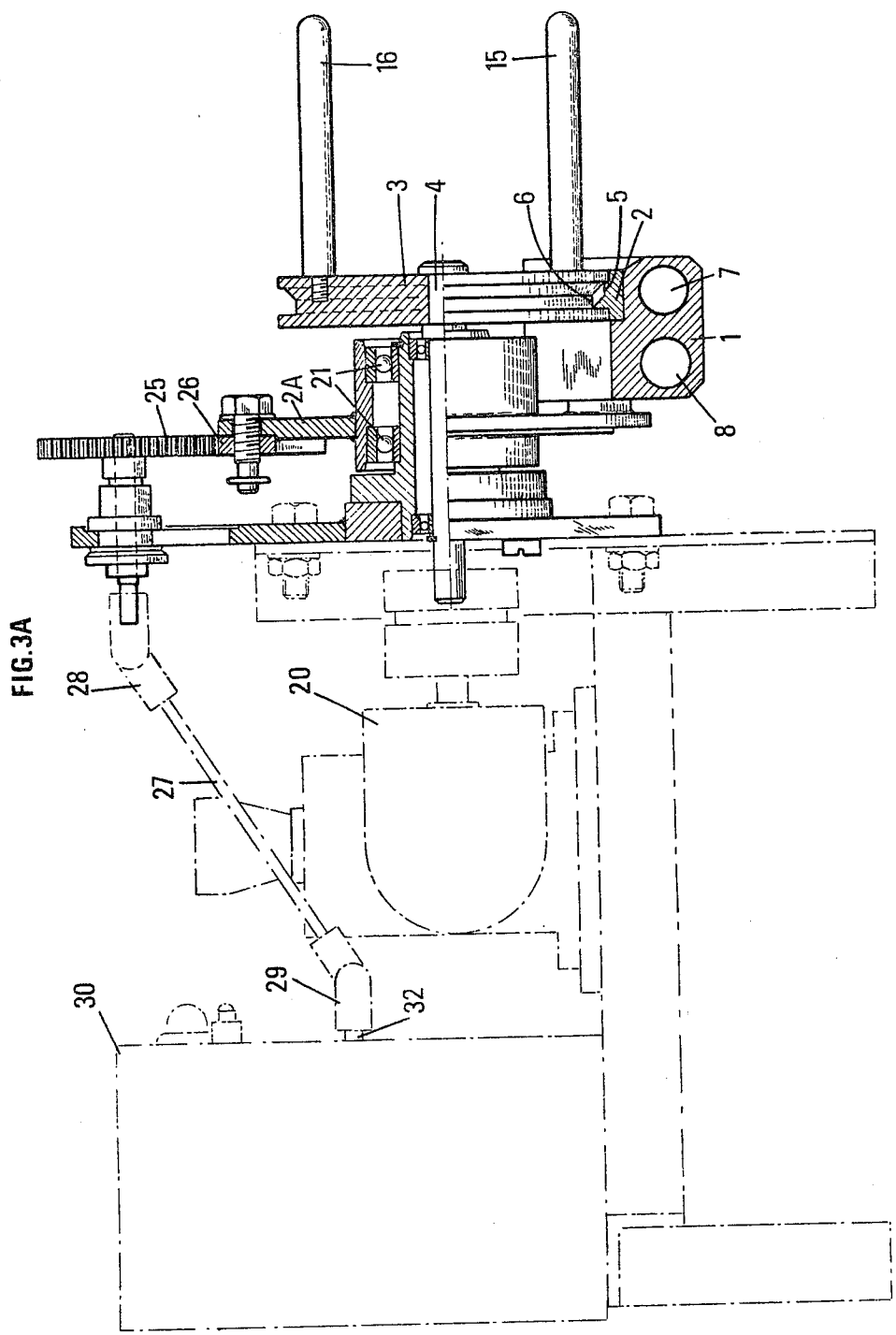
Figure 4:
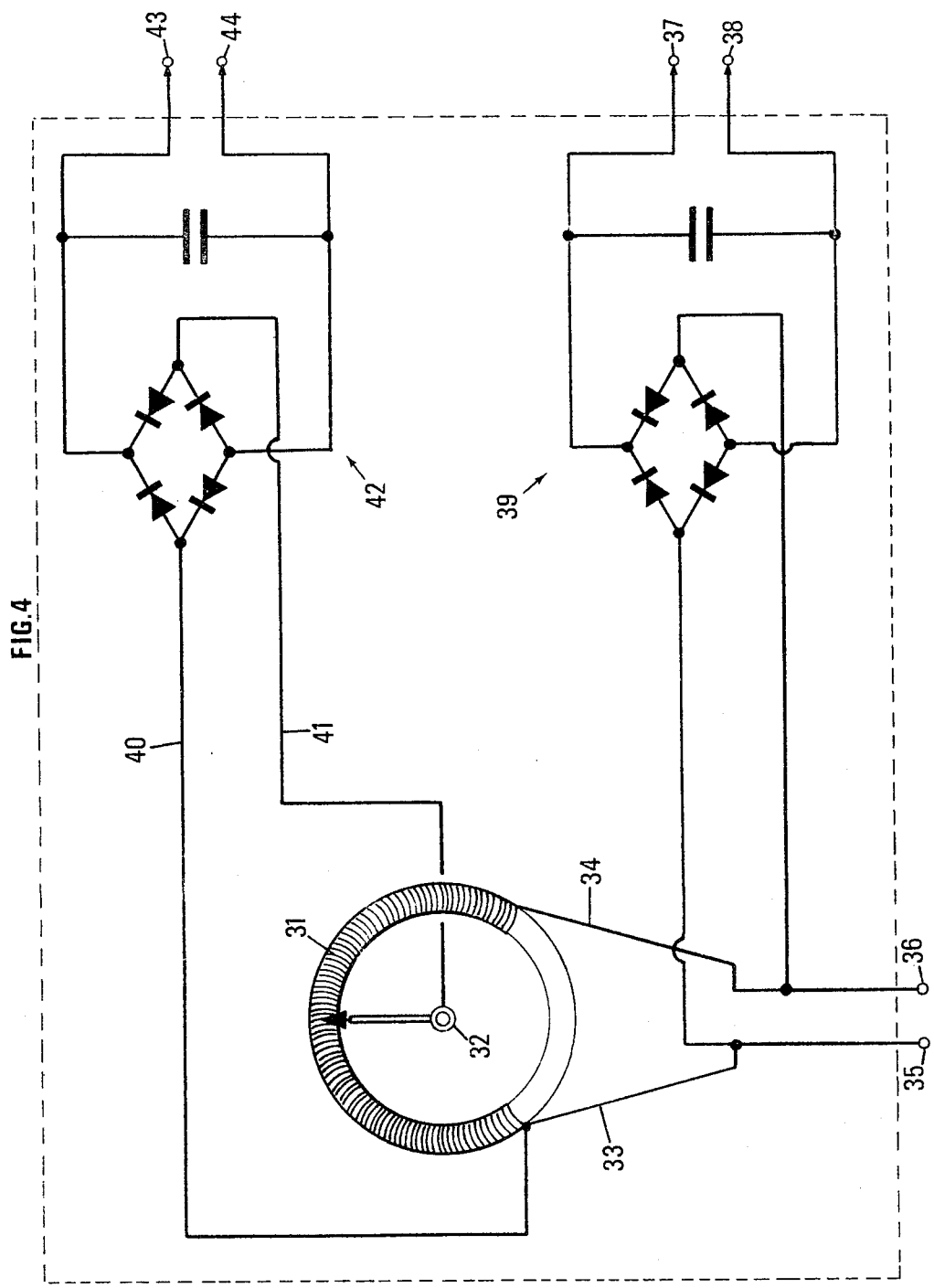

Non-limitative embodiments are illustrated by the accompanying drawings, wherein:

FIG. 1 is a basic diagram of a device for continuously manufacturing curved profiled members made of a plastic material reinforced by filaments, FIG. 2 is a detailed diagrammatic perspective view showing how can be performed traction and winding of the profiled member at the outlet of the die, FIG. 3 is a front view of a device according to the invention, FIG. 3A is a sectional view along line A—A of FIG. 3, FIG. 4 diagrammatically illustrates an embodiment of the means for automatically controlling the rotation speed.

In the different drawings, reference numeral 1 designates the frame of the device.

A die is formed of two complementary elements, a first of which (element 2) is connected to the frame 1, the second (element 3) being rotatably mounted on a shaft 4 carried by the frame member 1. This second element 3 is rotated by a direct current motor 19 through a speed variator 20. At least one of these two die elements comprises a groove (grooves 5 and 6, FIGS. 2 and 3A) defining a section of passage through the die for an assembly of filaments impregnated with a plastic material.

Heating of element 2 of the die can be achieved by means of electric resistors housed in bores 7 and 8 (FIG. 3A), an electric current supply being provided at 18 (FIGS. 1 and 3).

FIG. 1 shows how the filaments 9, for example glass filaments, which are unreeled from the spools 10, are joined or bound together at 11, so as to constitute rovings 12, which, after they have passed through a container 13 for impregnation with a plastic material or resin (e.g. an unsaturated polyester, an epoxy resin, a vulcanizable elastomer . . . etc. . . ), pass through the die constituted by the assembly of the elements 2 and 3. A guide member 14 places the rovings along a direction tangential to the grooves 5 and 6 of the die.

At the outlet of the die a traction is applied to the profiled member of armored plastic material, for example through the assembly of the two spindles 15 and 16, carried by the rotating element 3 of the die.

A roller 17 (FIGS. 1, 2 and 3) helps in detaching the profiled member at the outlet of the die, before said member is reeled on the spindles 15 and 16.

Cooling the profiled member may optionally be accelerated by using a jet of pressurized air at the outlet of the die.

The device according to the invention can be continuously operated under stable operating conditions, even in the absence of a perfect regulation of the heating of the die.

To this end, the device comprises means for continuously measuring the braking torque opposed by the profiled element during its formation within the die, in combination with automatic control means (which may be electrical or mechanical) of the rotation speed of the shaft 4, driving the rotating element 3 of the die.

These control means are connected to the measuring means so as to produce a variation of the rotation speed in response to a variation of the braking torque in the same direction.

Under these conditions, whenever, due to overheating of the die, the degree of advance of the polymerization reaction of the resin increases in the die, the rotation speed of shaft 4 is automatically increased, this shaft applying a traction force to the profiled element through the spindles 15 and 16.

Consequently the residence time of the product within the die is reduced, thus reducing the degree of advance of the polymerization reaction.

Conversely this rotation speed is automatically decreased if the braking torque decreases, which means a reduction in the degree of advance of the polymerization reaction in the die.

In the embodiment illustrated in FIGS. 3 and 3A, the means for continuously measuring the braking torque developed by the profiled element during its formation in the die, comprise a first element 2 of this die which is not stationary but integral with an element 2A (FIGS. 3 and 3A) which is freely rotatable about shaft 4, through the ball rollers 21.

The element 2A is connected to the frame 1 through a repelling resilient element, such as spring 22 connected to the frame member 1 through element 23.

When the viscosity of the product within the die increases, the first element 2 of the die, and thus the element 2A, tend to be driven in rotation by the rotating element 3 of the die, against the antagonistic action of spring 22. A screw 24 permits an adjustment of the tension of spring 22. The means for continuously measuring the braking torque are completed by means for detecting the variations of this torque, constituted by a toothed wheel 25 in mesh with a toothed sector which is integral with element 2A.

Under these conditions, any variation of the resisting torque results in a rotation of the toothed wheel 25 by an angle which is a function of this variation, in one or the other direction depending on the direction of said variation.

The rotation of the toothed wheel 25 is transmitted, through a shaft 27 and two Cardan joints 28 and 29, to means 30 controlling the rotation speed of shaft 4 as a function of the resistant torque.

FIG. 4 illustrates an embodiment of these control means. They comprise an auto-transformer 31 having a slider rotated by the shaft 32 which is fast in rotation with shaft 27, through the Cardan joint 29. The primary winding of this auto-transformer is connected through conductors 33 and 34 to the terminals 35 and 36 of a source of alternating current (which may be the supply circuit).

The electric voltage at the terminals of the primary circuit of transformer 31 is applied to the input terminals 37 and 38 of the inductor of a direct current motor 19, after passage through a diode bridge rectifier 39.

The electric voltage at the terminals of the secondary circuit of the transformer varies with the angular position of the shaft 32, thus with the position of the toothed wheel 25 (FIG. 3A). This electric voltage is consequently a function of the value of the braking torque acting against the advance of the curved profiled member through the die. This voltage is applied to the armature of the direct current motor 19 through conductors 43 and 44 and the bridge rectifier 19.

The rotation speed of the shaft of this motor 19, which is substantially proportional to the electric voltage applied to its armature, since the voltage between the terminals of the inductor remains constant, is thus automatically controlled by the value of the braking torque developed in the die.

Through a suitable connection it is thus possible to obtain a variation of the rotation speed substantially proportional to the variations of the braking torque within the die, said speed variation having the same direction as the torque variation.

Other embodiments of the automatic control means may also be used. For example the means for detecting the variations of the braking torque in the die may comprise at least one strain gauge connected to the frame 1 and to the element 2 of the die.

The displacements of this element with respect to the frame 1 will result in variations of the electrical voltage delivered by the strain gauge and this voltage may be used after amplification thereof, for controlling the intensity of the electric current supplied to the armature of the direct current motor 19.

We claim:

1. A device for continuously manufacturing a curved profiled member of plastic material reinforced with filaments, comprising a frame, a die formed of two complementary elements the first of which is secured to the frame and the other is rotatably mounted on said frame and connected to rotation driving means, at least one of said elements being provided with a groove which, together with the other element, forms a section of passage for a resin-impregnated assembly of filaments through the die, means for heating said first die for polymerization of the plastic material therein, means for continuously measuring the braking torque developed by the profiled member within the die during its formation, and means for automatically controlling the rotation speed of said driving means, said control means being connected to said measuring means and adapted to produce in response to a variation of the resisting torque, a corresponding variation of the rotation speed of the same direction as the torque variation.

2. A device according to claim 1, comprising means for adjusting said control means.

3. A device according to claim 1, wherein said first die element is freely rotatable about the axis of rotation of the second die element and said second die element is connected to the frame through elastic repelling means, said measuring means comprising means for detecting the propensity of said first die element to be driven in rotation by said second die element, against the action of said repelling means.

4. A device according to claim 3, wherein said detection means comprises a rotating element fast in rotation with said first element of the die.

5. A device according to claim 4, wherein said rotating element is toothed and said first die comprises a toothed part in mesh with said toothed rotating element.

6. A device according to claim 3, wherein said elastic repelling means is provided with means for adjusting its tension.

7. A device according to claim 3, wherein said detection means comprises at least one strain gauge connecting said first die element to said frame.

\* \* \* \* \*